US011372904B2

(12) United States Patent
Kaushik et al.

(10) Patent No.: US 11,372,904 B2
(45) Date of Patent: Jun. 28, 2022

(54) AUTOMATIC FEATURE EXTRACTION FROM UNSTRUCTURED LOG DATA UTILIZING TERM FREQUENCY SCORES

(71) Applicant: EMC IP Holding Company LLC, Hopkinton, MA (US)

(72) Inventors: Vibhor Kaushik, Shrewsbury, MA (US); Peter Beale, Acton, MA (US); Zachary W. Arnold, Charlottesville, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 443 days.

(21) Appl. No.: 16/572,006

(22) Filed: Sep. 16, 2019

(65) Prior Publication Data

US 2021/0081441 A1    Mar. 18, 2021

(51) Int. Cl.
*G06F 16/31*    (2019.01)
*G06F 9/455*    (2018.01)

(52) U.S. Cl.
CPC .......... *G06F 16/31* (2019.01); *G06F 9/45558* (2013.01)

(58) Field of Classification Search
None
See application file for complete search history.

(56) References Cited

U.S. PATENT DOCUMENTS 9,378,200 B1    6/2016  Cohen et al.
9,672,279 B1    6/2017  Cohen et al.
10,102,055 B1   10/2018 Gaber et al.
10,127,304 B1   11/2018 Cohen et al.
10,235,452 B1   3/2019  Savir et al.
10,275,408 B1   4/2019  Cohen et al.
2013/0346424 A1 12/2013 Zhang et al.
2017/0235735 A1 8/2017  Ignatyev et al.
2018/0349468 A1* 12/2018 Togawa ................ G06F 16/285

FOREIGN PATENT DOCUMENTS

WO    2016093837 A1    6/2016
WO    2017180475 A1   10/2017

* cited by examiner

*Primary Examiner* — Amresh Singh
(74) *Attorney, Agent, or Firm* — Ryan, Mason & Lewis, LLP (57) ABSTRACT

A method includes obtaining, in a given log processing node, at least two different types of logs associated with assets of an enterprise system. The method also includes generating, at the given log processing node, frequency scores for terms in unstructured log data of each of the different log types, the generated frequency score for a given term in unstructured log data of a given log type being based on (i) occurrence of the given term in historical logs of the given log type previously processed by log processing nodes and (ii) occurrence of the given term in the obtained logs of the given log type. The method further includes extracting, at the given log processing node, features from the obtained logs based on the frequency scores, detecting events affecting the assets utilizing the extracted features, and modifying a configuration of the assets responsive to detecting the events.

20 Claims, 6 Drawing Sheets

AUTOMATIC FEATURE EXTRACTION FROM UNSTRUCTURED LOG DATA UTILIZING TERM FREQUENCY SCORES

FIELD

The field relates generally to information processing, and more particularly to techniques for managing unstructured data.

BACKGROUND

In many information processing systems, log data from systems in the field is collected and analyzed to detect events, such as security threats, malfunctioning systems, etc. Such collection and analysis may be limited to highly structured data, as unstructured text data requires special treatment. For example, unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present disclosure provide techniques for automatic feature extraction from unstructured log data utilizing term frequency scores.

In one embodiment, a method comprises obtaining, in a given one of a plurality of log processing nodes, at least two different types of logs associated with a plurality of assets of an enterprise system. The method also comprises generating, at the given log processing node, frequency scores for terms in unstructured log data of each of the different log types, the generated frequency score for a given term in unstructured log data of a given log type being based at least in part on (i) occurrence of the given term in historical logs of the given log type previously processed by the plurality of log processing nodes and (ii) occurrence of the given term in the obtained logs of the given log type. The method further comprises extracting, at the given log processing node, features from the obtained logs based at least in part on the frequency scores, detecting one or more events affecting the plurality of assets of the enterprise system utilizing the extracted features, and modifying a configuration of one or more of the plurality of assets responsive to detecting the one or more events. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
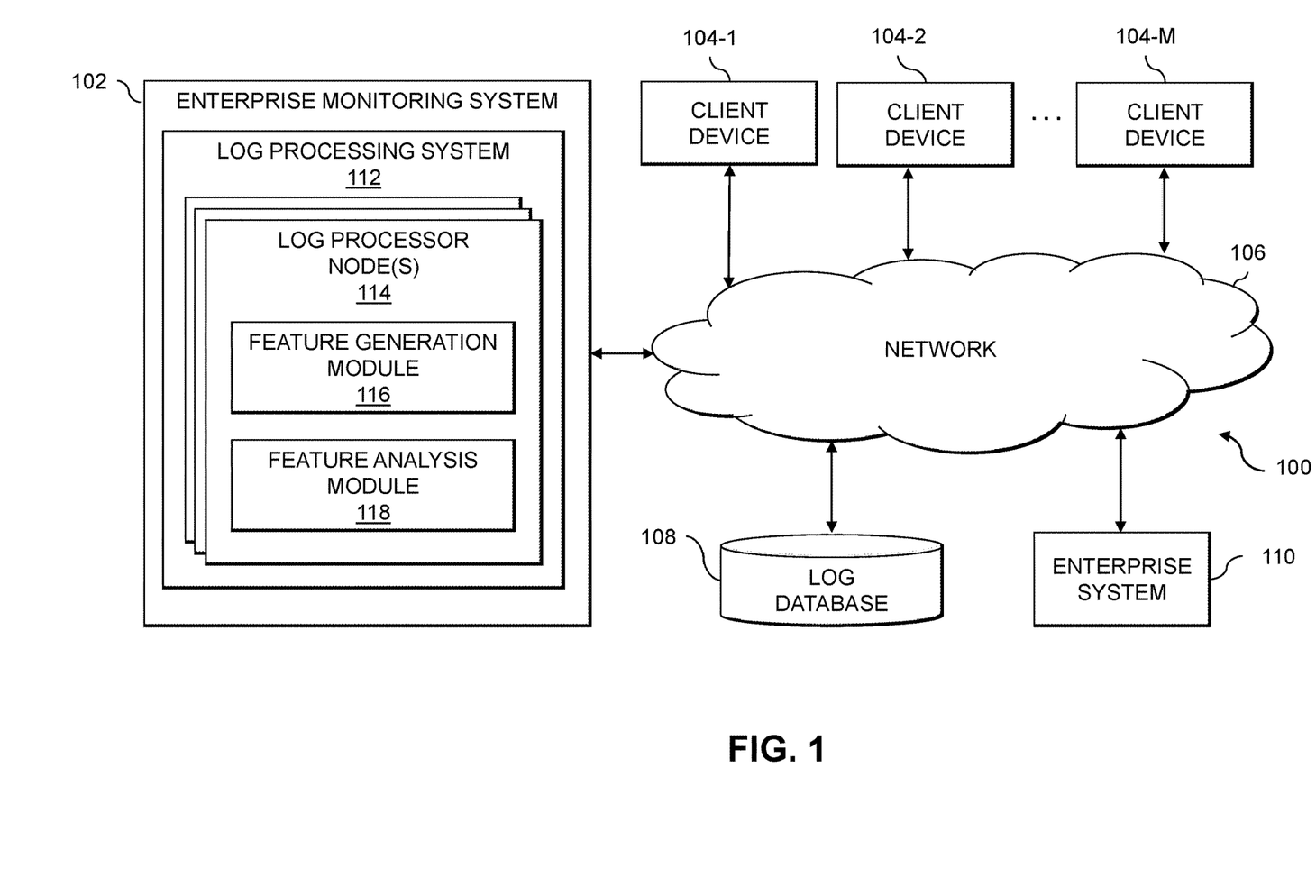
FIG. 1 is a block diagram of an information processing system for automatic feature extraction from unstructured log data utilizing term frequency scores in an illustrative embodiment.

FIG. 1 shows an information processing system 100 configured in accordance with an illustrative embodiment. The information processing system 100 is assumed to be built on at least one processing platform and provides functionality for automatic feature extraction from unstructured log data utilizing term frequency scores.

In this embodiment, the system 100 more particularly comprises an enterprise monitoring system 102 and a plurality of client devices 104-1, 104-2, ... 104-M, collectively referred to herein as client devices 104. The client devices 104 are coupled to a network 106. Also coupled to the network 106 is a log database 108, which may store various information relating to logs obtained from enterprise system 110. The enterprise system 110 is assumed to comprise a plurality of assets that are accessed or otherwise utilized by users of an organization or other enterprise, such as via client devices 104. The assets may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), software containers (also referred to herein as containers), etc. The assets of the enterprise system 110 are assumed to produce logs (either directly, or via monitoring tools monitoring such assets). Such logs, or information derived therefrom, are stored in log database 108 as described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The log database 108, as discussed above, is configured to store and record information relating to logs that are associated with assets of the enterprise system. Such information may include, but is not limited to, features extracted from unstructured data of such logs. As will be described in further detail below, in some embodiments the log database 108 may provide a "meta corpus" of term frequency-inverse document frequency (TF-IDF) scores for various terms in the logs. A meta corpus may be maintained for each of two or more different log types. Each system or other asset in the enterprise system 110 may produce different logs, containing information specific to different aspects of that asset. Such different logs are considered as different "log types" containing information specific to some aspect of an asset (e.g., one or more applications running on the asset, one or more features of an asset, etc.) The different log types may be produced by different monitoring tools or application programming interfaces (APIs) of the assets of the enterprise system 110.

The meta corpus for a given log type may include inverse document frequency (IDF) scores for terms in log data of the given log type, where the IDF scores in the meta corpus for logs of the given log type are periodically updated by a plurality of log processors implemented by the enterprise monitoring system 102 (e.g., via log processing system 112). For example, such log processors may generate respective "delta corpus" for each log type, where the delta corpus for a given log type generated by a given log processor includes incremental updates to the IDF scores in the meta corpus based at least in part on processing of logs by the given log processor.

The log database 108 in some embodiments is implemented using one or more storage systems or devices associated with the enterprise monitoring system 102. In some embodiments, one or more of the storage systems utilized to implement the log database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise monitoring system 102 and components thereof such as log processing system 112, as well as to support communication between the enterprise monitoring system 102, the log processing system 112 and other related systems and devices not explicitly shown.

In some embodiments, the client devices 104 may implement host agents that are configured for communication with the log processing system 112. Alerts or notifications generated by the log processing system 112 of the enterprise monitoring system 102 are provided over network 106 to client device 104 via the host agents. The host agents are assumed to be implemented via the client devices 104, which may comprise computing or processing devices associated with or operated by a system administrator, IT manager or other authorized personnel of the enterprise system 110. For example, a given host agent may comprise a mobile telephone equipped with a mobile application configured to receive alerts from the enterprise monitoring system 102 or the log processing system 112 and to provide an interface for the host agent to select particular remedial measures for responding to the alert or notification. Examples of such remedial measures may include blocking access by one or more of the client devices 104 to the enterprise system 110 or assets thereof, requiring user input or authentication by the client devices 104 to obtain information from or otherwise utilize one or more assets of the enterprise system 110, triggering further review of the enterprise system 110 or assets thereof, etc. Remedial measures may also include detecting and correcting (e.g., by modifying a configuration thereof) one or more malfunctioning assets (e.g., due to security threats affecting such assets, misconfiguration of such assets, etc.). The remedial measures may further include identifying other assets in the enterprise system 110 that may be subject to similar malfunctioning (e.g., due to the same security threat or misconfiguration, due to dependencies between assets, etc.) and appropriately altering configurations thereof.

It should be noted that a "host agent" as this term is generally used herein may comprise an automated entity, such as a software entity running on a processing device. Accordingly, a security agent or host agent need not be a human entity.

Although shown as an element of the enterprise monitoring system 102 in this embodiment, the log processing system 112 in other embodiments can be implemented at least in part externally to the enterprise monitoring system 102, for example, as a stand-alone server, set of servers or other type of system coupled to the network 106. In some embodiments, the log processing system 112 may be implemented at least in part within one or more of the client devices 104.

The log processing system 112 in the FIG. 1 embodiment is assumed to be implemented using at least one processing device. Each such processing device generally comprises at least one processor and an associated memory, and implements one or more functional modules for controlling certain features of the log processing system 112. In the FIG. 1 embodiment, the log processing system 112 comprises a set of log processing nodes 114, each of which implements a feature generation module 116 and a feature analysis module 118.

The log processing nodes 114 are configured to receive different subsets or portions of a plurality of logs that are associated with assets of the enterprise system 110. A given subset of the logs, obtained by a given one of the log processing nodes 114, is assumed to comprise multiple different types of logs. Each of the log processing nodes 114 is configured to utilize its respective feature generation module 116 to generate frequency scores for terms in the unstructured log data of the subset of logs that it obtains.

The frequency scores are generated per log type, and the generated frequency score for a given term in the unstructured log data of a given log type is based on occurrence of the given term in (i) historical logs of the given log type previously processed by the plurality of log processing nodes 114 (e.g., stored in a meta corpus as noted above) and occurrence of the given term in the given subset of logs of the given log type obtained by that log processing node 114 (e.g., to generate a delta corpus as noted above). The generated frequency scores may comprise IDF weights or scores for different terms. The feature generation module 116 for a given one of the log processing nodes 114 is configured to extract features from the given subset of logs obtained by the given log processing node based at least in part on the generated frequency scores (e.g., to generate TF-IDF weights or scores for the terms of a given log).

The feature analysis modules 118 of the log processing nodes 114 are configured to utilize the features extracted by their associated feature generation modules 116 to detect events that affect the assets of the enterprise system 110. Such events may be detected via anomalies in the extracted features (e.g., TF-IDF scores outside some designated thresholds). The anomalies may correspond to different types of events, such as security threats affecting assets of the enterprise system 110, malfunctioning of assets of the enterprise system 110, etc. The feature analysis modules 118 are further configured, responsive to detecting such events, to modify the configurations of one or more assets of the enterprise system 110 to address the events (e.g., to mitigate the security threat by applying security hardening procedures, fix malfunctioning assets, etc.).

It is to be appreciated that the particular arrangement of the enterprise monitoring system 102, the log processing system 112, the log processing nodes 114, the feature generation modules 116 and the feature analysis modules 118 illustrated in the FIG. 1 embodiment is presented by way of example only, and alternative arrangements can be used in other embodiments. As discussed above, for example, the enterprise monitoring system 102, the log processing system 112, the log processing nodes 114, the feature generation modules 116 and the feature analysis modules 118 may in some embodiments be implemented internal to one or more of the client devices 104. As another example, the functionality associated with the feature generation modules 116 and the feature analysis modules 118 may be combined into one module, or separated across more than two modules with the multiple modules possibly being implemented with multiple distinct processors or processing devices.

At least portions of the log processing nodes 114, the feature generation modules 116 and the feature analysis modules 118 may be implemented at least in part in the form of software that is stored in memory and executed by a processor.

It is to be understood that the particular set of elements shown in FIG. 1 for automatic feature extraction from unstructured log data utilizing term frequency scores is presented by way of illustrative example only, and in other embodiments additional or alternative elements may be used. Thus, another embodiment may include additional or alternative systems, devices and other network entities, as well as different arrangements of modules and other components.

By way of example, in other embodiments, the log processing system 112 may be implemented external to the enterprise monitoring system 102, such that the enterprise monitoring system 102 can be eliminated.

The enterprise monitoring system 102, including the log processing system 112, and other portions of the system 100 may be part of cloud infrastructure as will be described in further detail below.

The log processing system 112 and other components of the enterprise monitoring system 102 and information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The client devices 104 and the enterprise monitoring system 102 or components thereof (e.g., the log processing system 112, the log processing nodes 114, the feature generation modules 116 and the feature analysis modules 118) may be implemented on respective distinct processing platforms, although numerous other arrangements are possible. For example, in some embodiments at least portions of the log processing system 112 and one or more of the client devices 104 are implemented on the same processing platform. A given client device (e.g., 104-1) can therefore be implemented at least in part within at least one processing platform that implements at least a portion of the log processing system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the enterprise monitoring system 102, client devices 104, log database 108, and enterprise system 110, or portions or components thereof, to reside in different data centers. Numerous other distributed implementations are possible. The enterprise monitoring system 102, or portions thereof such as the log processing system 112 can also be implemented in a distributed manner across multiple data centers.

Additional examples of processing platforms utilized to implement the log processing system 112 and other portions of the system 100 in illustrative embodiments will be described in more detail below in conjunction with FIGS. 5 and 6.

It is to be appreciated that these and other features of illustrative embodiments are presented by way of example only, and should not be construed as limiting in any way.

Figure 2:
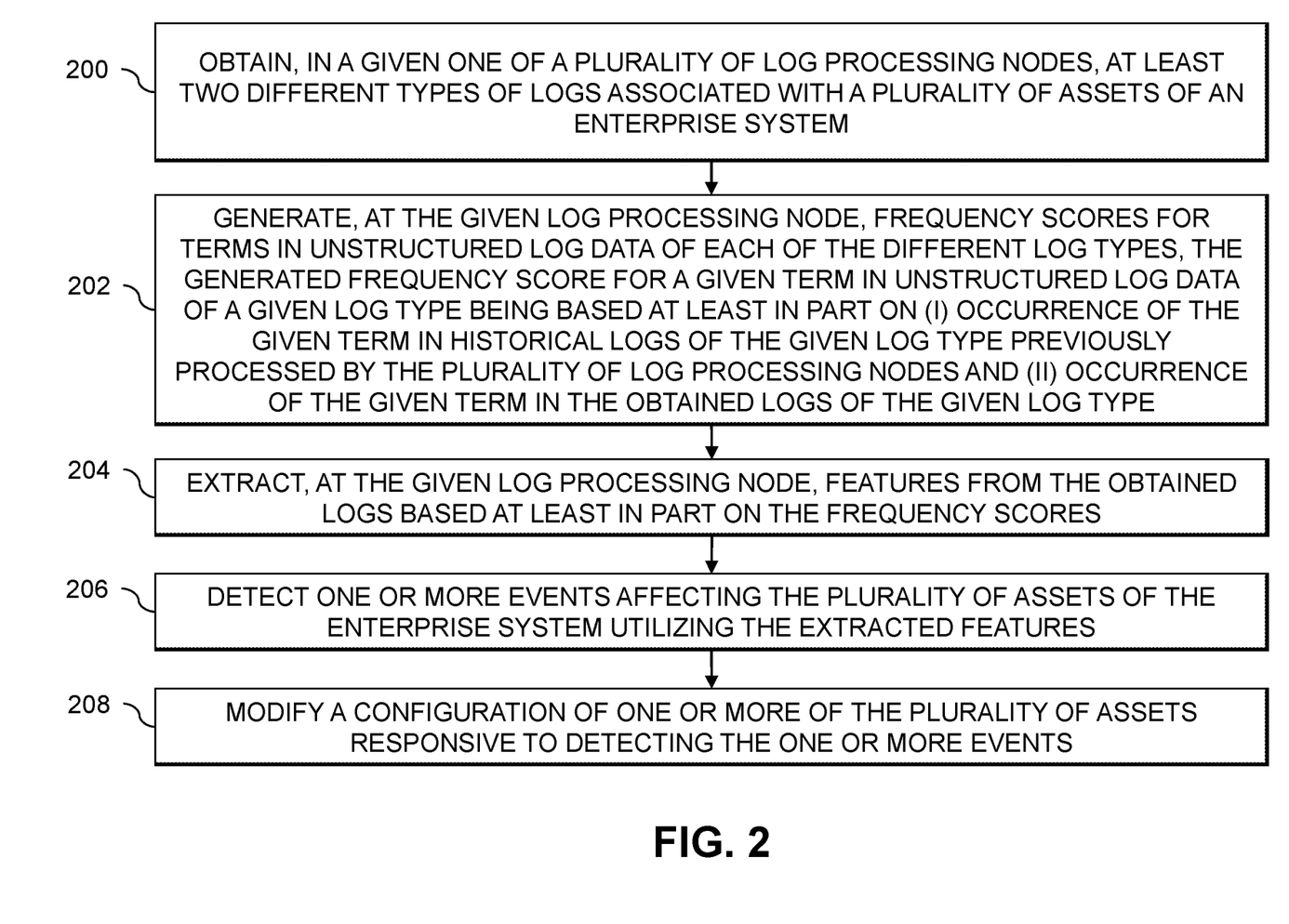
FIG. 2 is a flow diagram of an exemplary process for automatic feature extraction from unstructured log data utilizing term frequency scores in an illustrative embodiment.

An exemplary process for automatic feature extraction from unstructured log data utilizing term frequency scores will now be described in more detail with reference to the flow diagram of FIG. 2. It is to be understood that this particular process is only an example, and that additional or alternative processes for automatic feature extraction from unstructured log data utilizing term frequency scores may be performed.

In this embodiment, the process includes steps 200 through 208. These steps are assumed to be performed by the log processing system 112 utilizing the log processing nodes 114, the feature generation modules 116 and the feature analysis modules 118. The process begins with step 200, obtaining, in a given one of a plurality of log processing nodes, at least two different types of logs associated with a plurality of assets of an enterprise system. The at least two different types of logs may comprise a first type of logs obtained from a first monitoring tool that monitors a given type of assets in the enterprise system and at least a second type of logs obtained from a second monitoring tool that monitors the given type of assets in the enterprise system. The given log processing node, and other ones of the plurality of log processing nodes, may be implemented using virtual computing instances of a distributed computing platform, where the virtual computing instances comprise at least one of virtual machines and software containers.

The logs obtained in step 200 may be pre-processed before continuing to step 202. Such pre-processing may include identifying and removing noise from the obtained logs, such as by identifying and removing stop words, punctuation, uniform resource locators (URLs), etc. In step 202, the given log processing node generates frequency scores for terms in unstructured log data of each of the different log types. The generated frequency score for a given term in unstructured log data of a given log type may be based at least in part on (i) occurrence of the given term in historical logs of the given log type previously processed by the plurality of log processing nodes and (ii) occurrence of the given term in the obtained logs of the given log type. In step 204, features from the obtained logs are extracted based at least in part on the generated frequency scores.

In some embodiments, the frequency scores generated in step 202 are IDF weights or scores. The IDF score for a given term of a given log type may be computed based at least in part on a number of logs of the given log type in which the given term appears relative to a total number of logs of the given log type. The features extracted in step 204 in such cases may comprise TF-IDF scores, where a given TF-IDF score for the given term in a given log of the given log type is determined based at least in part on a number of occurrences of the given term in the given log and the generated frequency score for the given term and the given log type.

In some embodiments, step 204 includes reading a meta corpus for the given log type from a first data store accessible by the plurality of log processing nodes, and writing a delta corpus for the given log type to a second data store local to the given log processing node. The meta corpus comprises historical frequency scores previously computed by the plurality of log processing nodes indicating occurrence of terms in the historical logs of the given log type. The delta corpus comprises updates to the previously-computed historical frequency scores. The delta corpus for the given log type may be periodically provided from the second data store to the first data store to update the meta corpus for the given log type.

Writing the delta corpus for the given log type may comprise incrementally re-computing inverse document frequency scores for terms responsive to detecting occurrence of the terms in the obtained logs of the given log type. Incrementally re-computing the inverse document frequency scores may be paused while updating the meta corpus. Incrementally re-computing the inverse document frequency scores comprises, when the given term has an associated inverse document frequency score in the meta corpus, generating an update to a previously-computed inverse document frequency score for the given term by (i) incrementing the previously-computed inverse document frequency score for the given term based at least in part on a number of times that the given term occurs in the obtained logs of the given log type and (ii) saving the updated inverse document frequency score for the given term to the delta corpus for the given log type. Incrementally re-computing the inverse document frequency scores comprises, when the given term does not have an associated inverse document frequency score in the meta corpus, creating a new inverse document frequency score for the given term and adding the new inverse document frequency score to the delta corpus for the given log type. Periodically providing the delta corpus for the given log type from the second data store to the first data store to update the meta corpus is performed at a frequency determined based at least in part on a frequency of generation of the obtained logs.

In step 206, one or more events affecting the plurality of assets of the enterprise system are detected utilizing the extracted features. Responsive to detecting the one or more events in step 206, a configuration of one or more of the plurality of assets is modified in step 208. Step 208 may include identifying a given asset as a malfunctioning asset, and utilizing the extracted features to identify the one or more assets as assets affected by the malfunctioning asset. Step 208 may also or alternatively include applying one or more security hardening procedures to the configuration of the one or more assets (e.g., applying patches to fix vulnerabilities of the one or more assets, adding additional authentication mechanisms for accessing the one or more assets, placing the one or more assets behind a firewall in the enterprise system, etc.), identifying and correcting a misconfiguration of one or more aspects of the one or more assets, blocking one or more connections to the one or more assets, etc.

As discussed above, structured data that is collected from an enterprise system (e.g., collected "in the field") may be analyzed to detect issues, anomalies or other events. Machine learning systems, for example, may analyze highly structured data to detect issues, such as anomalies in access patterns, network behavior, operation of assets in an enterprise system, etc. It is often the case, however, that the structured data is only a small subset of the data available from the enterprise system. The vast majority of data available from the enterprise system may be in the form of unstructured log data. It is difficult to extract features from such unstructured log data. Illustrative embodiments provide techniques for extracting features from unstructured log data at scale, thereby permitting more efficient detection of issues, anomalies or other events in the enterprise system.

An enterprise system may include thousands of assets (e.g., physical or virtual computing devices) that are monitored, with each asset producing hundreds of logs. Each log needs to have its unique individual features extracted and clearly identified so that such features may be used within a machine learning environment that analyzes the log data to detect issues, anomalies or other events in the enterprise system. To identify unique features in the logs from a single asset of the enterprise system, information about all assets in the enterprise system should be leveraged. It is difficult, however, to maintain all the cross-asset information required to determine the unique set of features for any individual asset. This difficulty is compounded as the number assets, the number of logs per asset, and the time over which asset behavior is tracked grows.

In some embodiments, a highly scalable TF-IDF algorithm is used for extracting unique features for each type of log that arrives. First, all logs are extracted from all the assets running in the enterprise system (e.g., servers or other computing systems running in a production environment of an enterprise system). The raw logs may contain noise, and thus the raw logs are subject to pre-processing. The pre-processing may include detecting and removing various terms, such as stop words (e.g., the, a, an in, at, etc.), URLs, punctuation, etc. Pre-processing provides numerous advantages, greatly increasing the accuracy of the feature extraction process. Without pre-processing, the accuracy of features will be affected at large. After pre-processing, a feature vector is created for each of the logs. In some embodiments, the feature vector considers only unigram features for the pre-processed logs. The unigram features are individual words in the logs (e.g., ESRS (Secure Remote Services), fail error, etc.). Any new features that are found are recorded. In some embodiments, a Network File System (NFS) is used to maintain all the necessary records.

TF-IDF provides a weighting scheme that may be used in text mining. TF-IDF is the product of the term frequency (TF) and inverse document frequency (IDF), where TF describes the importance of a term in a document (e.g., in a log) and IDF represents the importance of the term in the entire document collection (e.g., across a set of logs). TF-IDF scores may be computed according to:

$$TF\text{-}IDF(t, d) = tf(t, d) * idf(t)$$

$$idf(t) = \log\left(\frac{N}{df(t)}\right)$$

where t denotes a term, d denotes a document, N denotes the total number of documents, and df(t) denotes the document frequency of term t. The term frequency, tf(t, d), represents the number of times the term t occurs in document d. The inverse document frequency, idf(t), helps to penalize the term frequency of t if t occurs in almost all the documents in a data corpus. Here, N is the total number of documents in a data corpus and df (t) denotes the number of documents in which the term t occurs at least once. Given the above, the features of a log may be mapped to a vocabulary or dictionary to generate that log's feature vector with associated TF-IDF scores. The vocabulary or dictionary may take the form of a vocabulary document that maintains a document frequency for each word (e.g., in how many documents each word has occurred). The ledger of the vocabulary or dictionary is used to calculate the IDF for each word present in a log. The document frequency, df(t), may be obtained from the vocabulary document.

Logs may be obtained from assets in an enterprise system in real time (e.g., logs may flow continuously from assets or tools monitoring the assets in the enterprise system). As such, the number of words or terms in the logs corpus will be dynamic. Accordingly, document frequency will be different whenever new logs arrive. This impacts the IDF of the terms. To account for this, some embodiments incrementally re-compute IDF for each term when new logs arrive. Each term is added to the logs corpus, and if a term already exists in the corpus then the term count for that term is incremented by the number of times it occurs in the new logs. If new terms are identified (e.g., terms not already in the logs corpus), the terms are added to the logs corpus. Given the above, computing the TF-IDF scores may use the following:

$$TF\text{-}IDF(t, l) = tf(t, l) * idf(t)$$

$$idf(t) = \log\left(\frac{N}{df(t)}\right)$$

where tf(t, l) is the TF-IDF value for term t in log l from the logs corpus (e.g., of past or previous chunks and a current chunk of logs being analyzed). The idf(t) is the inverse document frequency of the term t. The df(t) represents the number of logs N (e.g., of past or previous chunks and the current chunk of logs being analyzed) in which the term t occurs at least once. The log features may then be mapped to a vocabulary or dictionary to generate its feature vector space.

Figure 3:
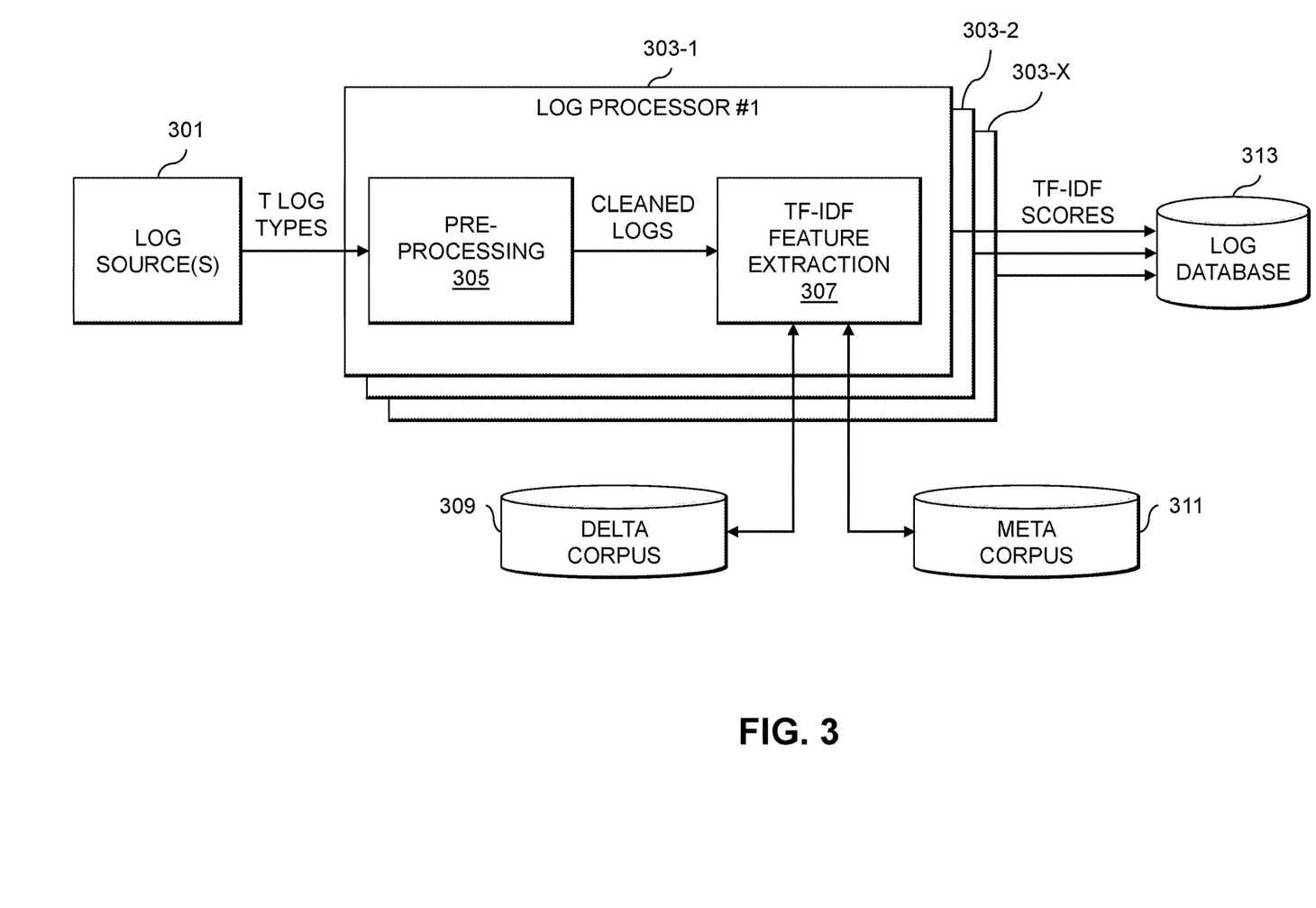
FIG. 3 shows feature extraction from log data using log processors in an illustrative embodiment.

FIG. 3 shows a process flow for generating TF-IDF scores for log data. Log sources 301 (e.g., assets in an enterprise system, monitoring tools that monitor the assets in the enterprise system, etc.) provide logs of N different types to a set of log processors 303-1, 303-2, . . . 303-X (collectively, log processors 303). For example, the logs from log sources 301 may be partitioned among the available log processors 303 (e.g., evenly, based at least in part on available resources of the log processors 303, etc.) The log processors 303 may be implemented using different virtual resources (e.g., virtual machines, software containers, etc.) of a distributed computing platform (e.g., a cloud computing platform).

Each of the log processors 303 is assumed to implement a pre-processing module 305 and a TF-IDF feature extraction module 307. The pre-processing module 305 "cleans" the logs from the log sources 301, such as by removing noise therefrom (e.g., identifying and removing stop words, URLs, punctuation, etc.). The cleaned logs are provided from the pre-processing module 305 to the TF-IDF feature extraction module 307. The TF-IDF feature extraction module 307 of each of the log processors 303 saves a delta corpus 309 for each of the T log types (e.g., there are N*X delta corpus saved). The IDF is computed by the TF-IDF feature extraction module 307 for logs of a given log type (e.g., one for each of T log types by each of the X log processors 303). The TF-IDF scores, again one for each of T log types by each of the X log processors 303, are saved to a log database 313. The TF-IDF scores are features used for analyzing the logs to identify or detect issues, anomalies or other events in the enterprise system. The TF-IDF algorithm assigns scores or weights to each word or feature present in a log based on the TF and IDF. If words such as "fail," "error," "failure," etc. have high TF-IDF scores (e.g., TF-IDF scores above some designated threshold), this may correspond to an issue affecting one or more assets and thus an event may be detected.

The X log processors 303 are configured to run simultaneously or concurrently to meet the demands of the number of systems or assets per time period (e.g., per day), where each system or asset has T log types. To scale effectively, some embodiments store the features (e.g., TF-IDF scores) and the changes to the corpuses in a data store specific to the log processor. The data store specific to the log processor stores N different delta corpus. Thus, there is a total of N*X delta corpus saved by the X log processors 303 collectively. To calculate TF-IDF scores for each log type, the algorithm reads the meta corpus 311 for that log type and stores the resulting TF-IDF values and delta corpus 309 for that log type in a data store specific to a particular log processor 303 instance.

To prevent generating invalid TF-IDF scores or values resulting from a race condition among the log processors 303, TF-IDF processing by the TF-IDF feature extraction module 307 of each log processor 303 may be paused (e.g., once a day) while the meta corpus 311 is updated. This will ensure that features are up-to-date. Once each meta corpus 311 (e.g., one for each log type N) is updated, processing by the TF-IDF feature extraction modules 307 can resume. In some embodiments, the system cleans up "stale" feature values by having old values (e.g., values whose age exceeds some designated threshold) aged out during the periodic update of the meta corpus 311 for each log type. This ensures that the TF-IDF values are valid indefinitely.

Figure 4:
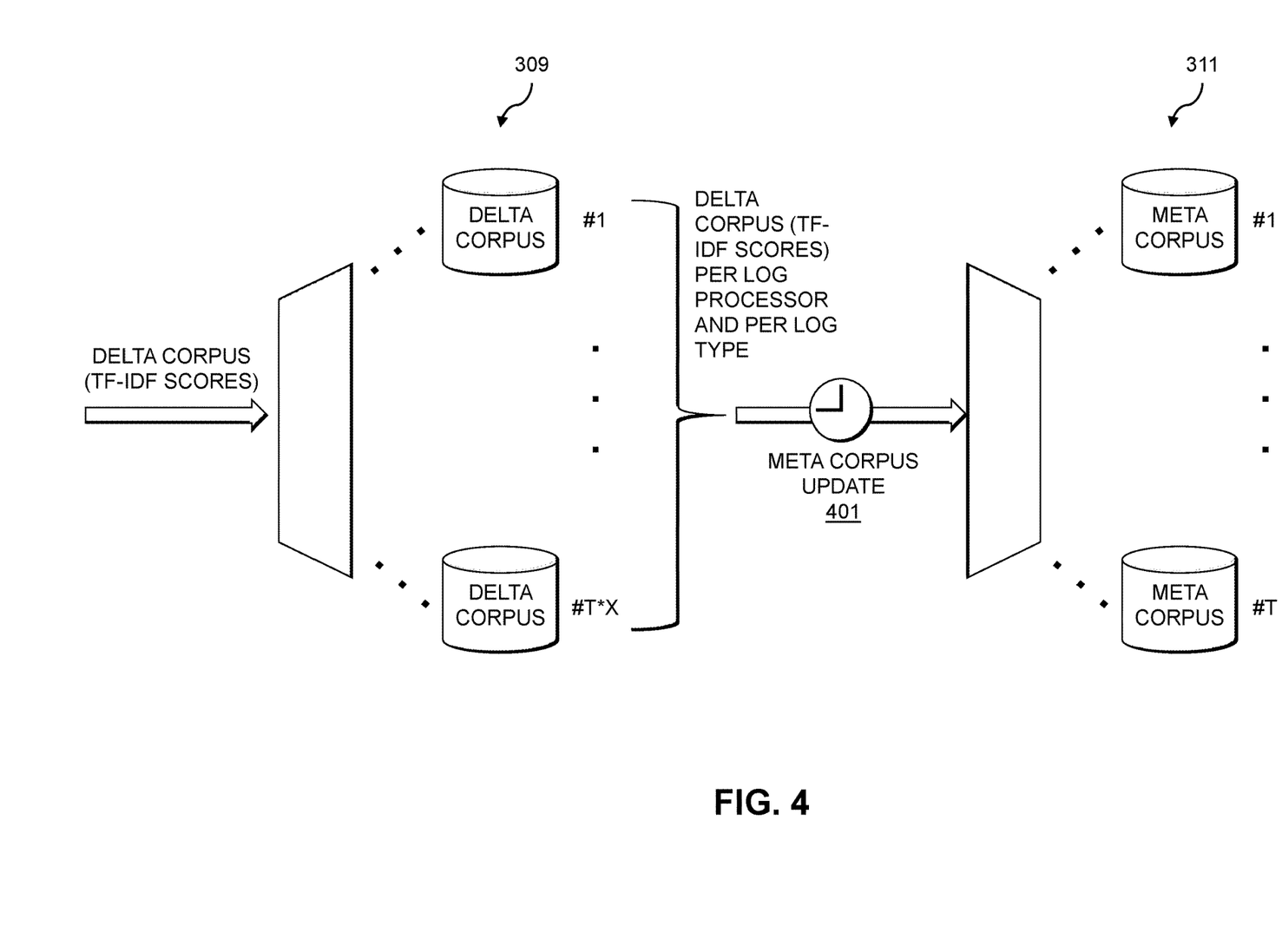
FIG. 4 shows a process flow for updating a meta corpus of terms in an illustrative embodiment.

FIG. 4 illustrates update 401 of the meta corpus 311, which may occur periodically (e.g., once a day or at some other defined period such as once a week, once a month, etc.) or in response to detection of some condition (e.g., receiving a threshold number of new logs to be analyzed, a threshold number of new terms in the logs, user request, etc.). In some embodiments, the choice of when to perform a meta corpus update is based at least in part on how frequent logs are submitted or otherwise obtained. For example, if logs are submitted or made available to the log processors 303 once a day, it is appropriate to update the meta corpus daily.

A set of delta corpus 309 are provided from the log processors 303. As noted above, there are N*X different delta corpus 309, where N is the number of log types and X is the number of instances of the log processors 303. The delta corpus 309 (e.g., including TF-IDF scores) per log processor 303 and per log type are used in a meta corpus update 401 to update the meta corpus 311. As noted above, there are N meta corpus 311, where N is the number of log types.

Once extracted, the TF-IDF features from unstructured log data may be used for detecting various events in an enterprise system. For example, the TF-IDF features may be used for anomaly detection (e.g., labeling or identifying malfunctioning assets in the enterprise system). The TF-IDF features may also be used for pattern analysis. For example, on detecting a malfunctioning asset, TF-IDF features may be used to identify other assets that might malfunction as result of the detected malfunctioning asset. For example, TF-IDF scores may be used to identify other assets suffering from the same issues as the malfunctioning asset using single word features with their associated TF-IDF scores (e.g., TF-IDF scores of other assets that are within some designated threshold of the TF-IDF scores of the malfunctioning asset).

Illustrative embodiments provide techniques for automatic feature extraction from unstructured log data utilizing term frequency scores. Advantageously, embodiments are highly scalable, permitting incremental updates to IDF weights used in computing TF-IDF scores from unstructured log data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automatic feature extraction from unstructured log data utilizing term frequency scores will now be described in greater detail with reference to FIGS. 5 and 6. Although described in the context of system 100, these platforms may also be used to implement at least portions of other information processing systems in other embodiments.

Figure 5:
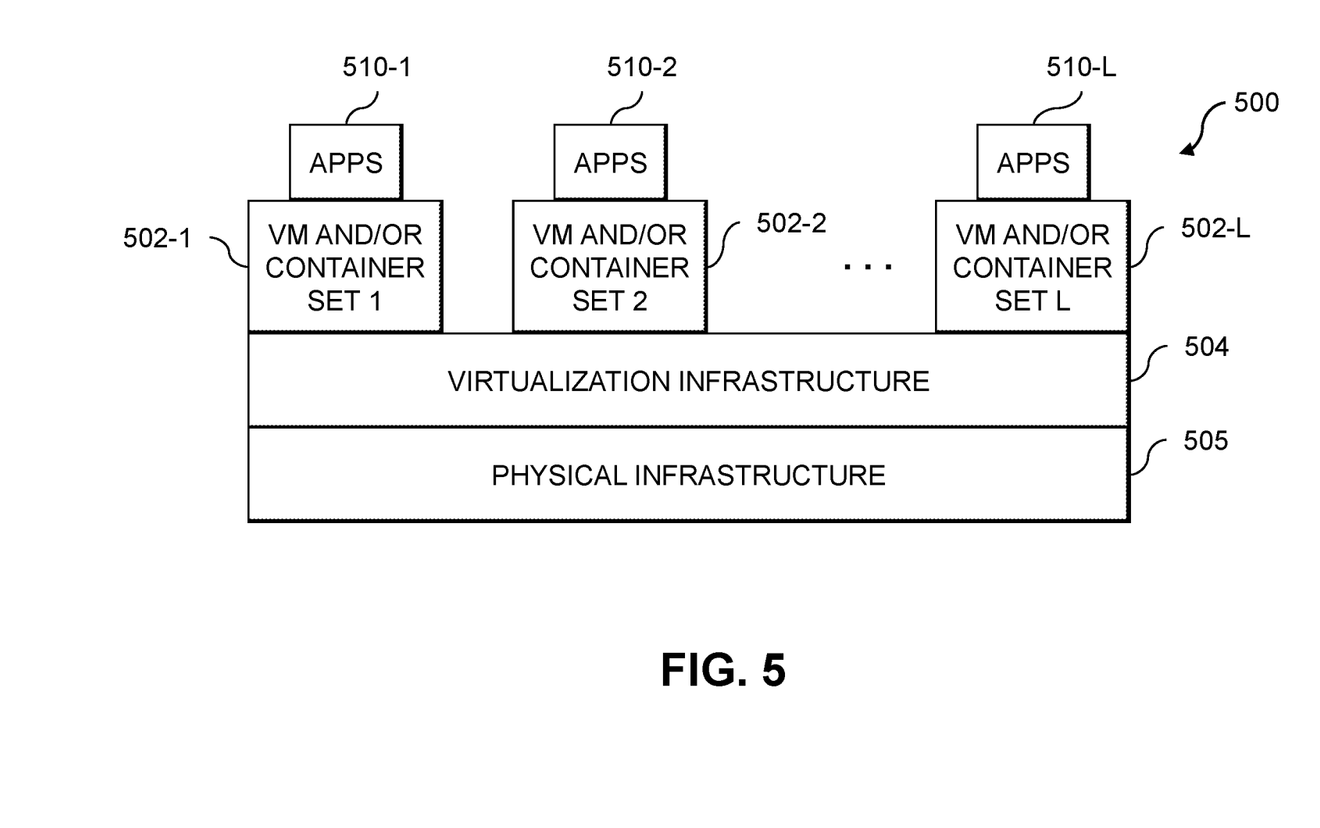
FIGS. 5 and 6 show examples of processing platforms that may be utilized to implement at least a portion of an information processing system in illustrative embodiments.
Figure 6:
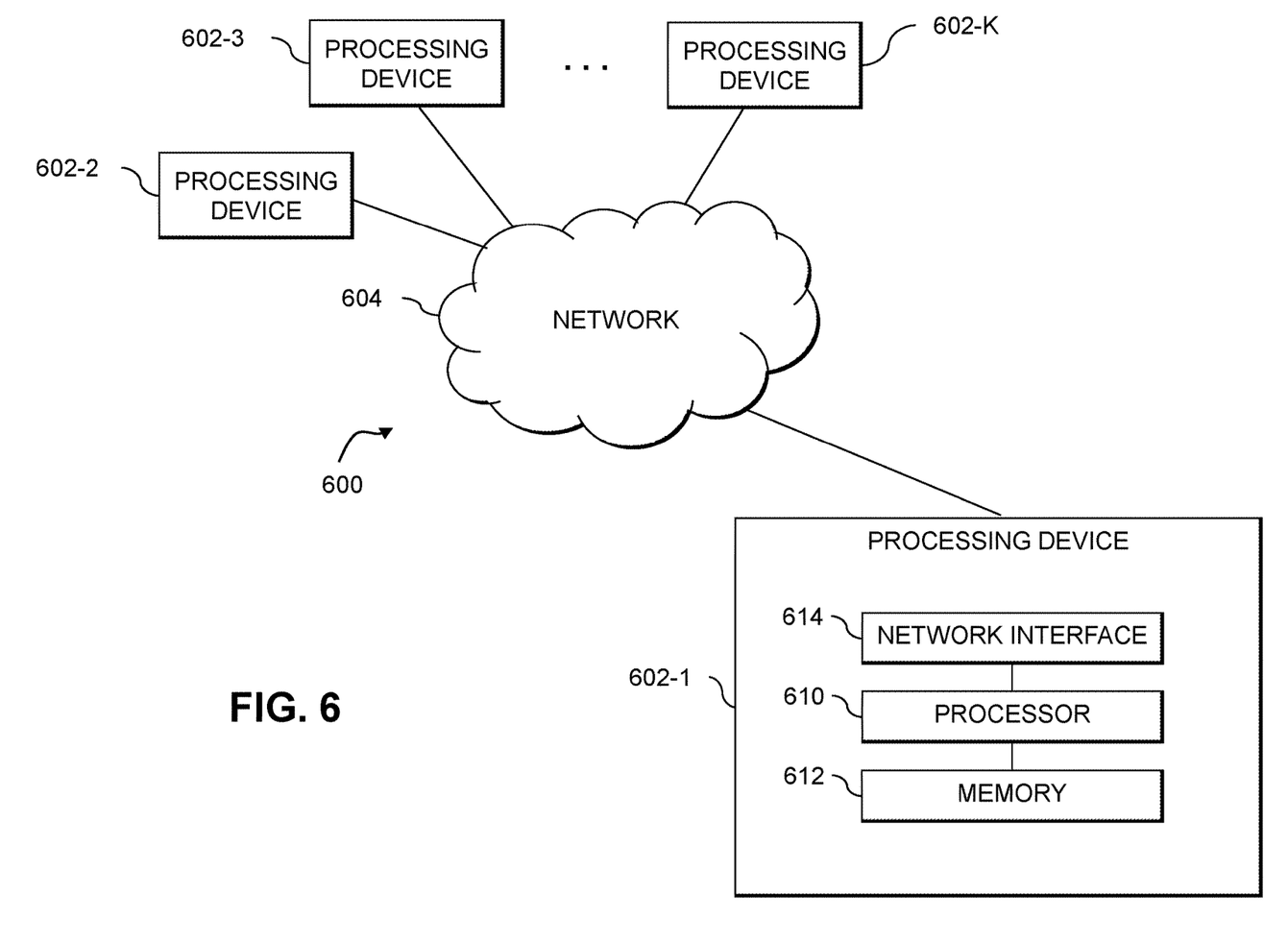

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automatic feature extraction from unstructured log data utilizing term frequency scores as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, log types, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
obtaining, by a given one of a plurality of log processing nodes, a plurality of logs, the plurality of logs comprising two or more different types of logs associated with a plurality of assets, the plurality of assets comprising at least one of physical and virtual computing resources;
generating, at the given log processing node, node-specific frequency scores for terms in unstructured log data of each of the two or more different log types, the generated node-specific frequency score for a given term in unstructured log data of a given one of the two or more different log types being based at least in part on (i) a node-generic frequency score component for the given term characterizing occurrence of the given term in historical logs of the given log type previously processed by the plurality of log processing nodes and (ii) a node-specific frequency score component for the given term computed at the given log processing node characterizing occurrence of the given term in the plurality of logs of the given log type obtained by the given log processing node;
extracting, at the given log processing node, features from the plurality of logs based at least in part on the node-specific frequency scores;
detecting one or more events affecting the plurality of assets utilizing the extracted features; and
modifying a configuration of one or more of the plurality of assets responsive to detecting the one or more events;
wherein the node-generic frequency score component for the given term is read from a shared data store accessible to the plurality of log processing nodes;
wherein the node-generic frequency score component for the given term is periodically updated by writing, to the shared data store, the node-specific frequency score component for the given term computed at the given log processing node and one or more additional node-specific frequency score components for the given term computed at one or more additional ones of the plurality of log processing nodes; and
wherein the method is performed by at least one processing device comprising a processor coupled to a memory.

2. The method of claim 1 wherein the given log processing node comprises a virtual computing instance of a distributed computing platform, the virtual computing instance comprising at least one of a virtual machine and a software container.

3. The method of claim 1 further comprising pre-processing the plurality of logs to remove noise, wherein pre-processing the plurality of logs comprises identifying and removing at least one of stop words, punctuation, and uniform resource locators.

4. The method of claim 1 wherein the generated frequency score for the given term comprises an inverse document frequency score computed based at least in part on a number of logs of the given log type in which the given term appears relative to a total number of logs of the given log type.

5. The method of claim 4 wherein the extracted features comprise term frequency-inverse document frequency scores, a given term frequency-inverse document frequency score for the given term in a given log of the given log type being determined based at least in part on a number of occurrences of the given term in the given log and the generated frequency score for the given term.

6. The method of claim 1 wherein computing the node-specific frequency component for the given term at the given log processing node comprises maintaining the node-specific frequency component for the given term in a local data store of the given log processing node, and periodically providing the node-specific frequency score component for the given term from the local data store to the shared data store to update the node-generic frequency score component for the given term.

7. The method of claim 1 wherein computing the node-specific frequency score component for the given term comprises incrementally re-computing an inverse document frequency score for the given term responsive to detecting occurrence of the given term in the plurality of logs of the given log type.

8. The method of claim 7 further comprising pausing incrementally re-computing the inverse document frequency scores while updating the node-generic frequency score component for the given term.

9. The method of claim 7 wherein incrementally re-computing the inverse document frequency score for the given term comprises, when the given term has an associated previously-computed inverse document frequency score in the shared data store, generating an update to the previously-computed inverse document frequency score for the given term by (i) incrementing the previously-computed inverse document frequency score for the given term based at least in part on a number of times that the given term occurs in the plurality of logs of the given log type and (ii) saving the updated inverse document frequency score for the given term to a local data store of the given log processing node.

10. The method of claim 7 wherein incrementally re-computing the inverse document frequency score for the given term comprises, when the given term does not have an associated inverse document frequency score in the shared data store, creating a new inverse document frequency score for the given term and adding the new inverse document frequency score to a local data store of the given log processing node.

11. The method of claim 1 wherein periodically updating the node-generic frequency score component for the given term is performed at a frequency determined based at least in part on a frequency of generation of logs of the given log type.

12. The method of claim 1 wherein the two or more different types of logs comprise:
a first type of logs obtained from a first monitoring tool that monitors assets of a given asset type; and
at least a second type of logs obtained from a second monitoring tool that monitors the assets of the given asset type.

13. The method of claim 1 wherein modifying the configuration of the one or more assets comprises:
identifying a given one of the plurality of assets as a malfunctioning asset; and
utilizing the extracted features to identify the one or more assets as assets affected by the malfunctioning asset.

14. The method of claim 1 wherein modifying the configuration of the one or more assets comprises at least one of:
applying one or more security hardening procedures to the configuration of the one or more assets;
identifying and correcting a misconfiguration of one or more aspects of the one or more assets; and
blocking one or more connections to the one or more assets.

15. A computer program product comprising a non-transitory processor-readable storage medium having stored therein program code of one or more software programs, wherein the program code when executed by at least one processing device causes the at least one processing device to perform steps of:
obtaining, by a given one of a plurality of log processing nodes, a plurality of logs, the plurality of logs comprising two or more different types of logs associated with a plurality of assets, the plurality of assets comprising at least one of physical and virtual computing resources;
generating, at the given log processing node, node-specific frequency scores for terms in unstructured log data of each of the two or more different log types, the generated node-specific frequency score for a given term in unstructured log data of a given one of the two or more different log types being based at least in part on (i) a node-generic frequency score component for the given term characterizing occurrence of the given term in historical logs of the given log type previously processed by the plurality of log processing nodes and (ii) a node-specific frequency score component for the given term computed at the given log processing node characterizing occurrence of the given term in the plurality of logs of the given log type obtained by the given log processing node;
extracting, at the given log processing node, features from the plurality of logs based at least in part on the node-specific frequency scores;
detecting one or more events affecting the plurality of assets utilizing the extracted features; and
modifying a configuration of one or more of the plurality of assets responsive to detecting the one or more events;
wherein the node-generic frequency score component for the given term is read from a shared data store accessible to the plurality of log processing nodes; and
wherein the node-generic frequency score component for the given term is periodically updated by writing, to the shared data store, the node-specific frequency score component for the given term computed at the given log processing node and one or more additional node-specific frequency score components for the given term computed at one or more additional ones of the plurality of log processing nodes.

16. The computer program product of claim 15 wherein the generated frequency score for the given term comprises an inverse document frequency score computed based at least in part on a number of logs of the given log type in which the given term appears relative to a total number of logs of the given log type, and wherein the extracted features comprise term frequency-inverse document frequency scores, a given term frequency-inverse document frequency score for the given term in a given log being determined based at least in part on a number of occurrences of the given term in the given log and the generated frequency score for the given term.

17. The computer program product of claim 15 wherein computing the node-specific frequency component for the given term at the given log processing node comprises maintaining the node-specific frequency component for the given term in a local data store of the given log processing node, and periodically providing the node-specific frequency score component for the given term from the local data store to the shared data store to update the node-generic frequency score component for the given term.

18. An apparatus comprising:
at least one processing device comprising a processor coupled to a memory;
the at least one processing device being configured to perform steps of:
obtaining, by a given one of a plurality of log processing nodes, a plurality of logs, the plurality of logs comprising two or more different types of logs associated with a plurality of assets, the plurality of assets comprising at least one of physical and virtual computing resources;
generating, at the given log processing node, node-specific frequency scores for terms in unstructured log data of each of the two or more different log types, the generated node-specific frequency score for a given term in unstructured log data of a given one of the two or more different log types being based at least in part on (i) a node-generic frequency score component for the given term characterizing occurrence of the given term in historical logs of the given log type previously processed by the plurality of log processing nodes and (ii) a node-specific frequency score component for the given term computed at the given log processing node characterizing occurrence of the given term in the plurality of logs of the given log type obtained by the given log processing node;
extracting, at the given log processing node, features from the plurality of logs based at least in part on the node-specific frequency scores;
detecting one or more events affecting the plurality of assets utilizing the extracted features; and
modifying a configuration of one or more of the plurality of assets responsive to detecting the one or more events;
wherein the node-generic frequency score component for the given term is read from a shared data store accessible to the plurality of log processing nodes; and
wherein the node-generic frequency score component for the given term is periodically updated by writing, to the shared data store, the node-specific frequency score component for the given term computed at the given log processing node and one or more additional node-specific frequency score components for the given term computed at one or more additional ones of the plurality of log processing nodes.

19. The apparatus of claim 18 wherein the generated frequency score for the given term comprises an inverse document frequency score computed based at least in part on a number of logs of the given log type in which the given term appears relative to a total number of logs of the given log type, and wherein the extracted features comprise term frequency-inverse document frequency scores, a given term frequency-inverse document frequency score for the given term in a given log being determined based at least in part on a number of occurrences of the given term in the given log and the generated frequency score for the given term.

20. The apparatus of claim 18 wherein computing the node-specific frequency component for the given term at the given log processing node comprises maintaining the node-specific frequency component for the given term in a local data store of the given log processing node, and periodically providing the node-specific frequency score component for the given term from the local data store to the shared data store to update the node-generic frequency score component for the given term.

* * * * *